(12) United States Patent
Nakao et al.

(10) Patent No.: US 11,943,103 B2
(45) Date of Patent: Mar. 26, 2024

(54) NETWORK SYSTEM, NETWORK MANAGEMENT APPARATUS, AND NETWORK MANAGEMENT METHOD EXECUTING SETTING OF A PATH AND PARAMETERS

(71) Applicant: Sony Corporation, Tokyo (JP)

(72) Inventors: Tsuyoshi Nakao, Tokyo (JP); Shinjiro Tanaka, Tokyo (JP); Hideyuki Imaida, Tokyo (JP); Takahiro Nishikawa, Tokyo (JP); Tooru Amano, Tokyo (JP); Teruo Kajiura, Tokyo (JP); Satoru Kamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/273,552

(22) PCT Filed: Aug. 27, 2019

(86) PCT No.: PCT/JP2019/033402
§ 371 (c)(1),
(2) Date: Mar. 4, 2021

(87) PCT Pub. No.: WO2020/054391
PCT Pub. Date: Mar. 19, 2020

(65) Prior Publication Data
US 2021/0211354 A1   Jul. 8, 2021

(30) Foreign Application Priority Data

Sep. 13, 2018 (JP) ................................ 2018-171182

(51) Int. Cl.
*H04L 41/0813* (2022.01)
*H04N 21/6332* (2011.01)

(52) U.S. Cl.
CPC ..... *H04L 41/0813* (2013.01); *H04N 21/6332* (2013.01)

(58) Field of Classification Search
CPC .................. H04L 41/0813; H04N 21/6332
See application file for complete search history.

(56) References Cited

U.S. PATENT DOCUMENTS

2006/0271695 A1   11/2006   Lavian
2007/0282748 A1*  12/2007   Saint Clair ......... H04L 41/0806
                                                              705/51

(Continued)

FOREIGN PATENT DOCUMENTS

JP           4283851 B2      6/2009
JP        2010-26707 A       2/2010

(Continued)

OTHER PUBLICATIONS

International Search Report dated Nov. 19, 2019 in PCT/JP2019/033402 filed Aug. 27, 2019, 2 pages.
Karasawa, S., et al., "Update Equipment overview of TV Asahi Signal Distribution, Routing and Remote control Center", Broadcast Engineering, Kenroku Kan Publishing co., Ltd., Nishimura, Tamae, vol. 70, No. 1, 2017, pp. 131-147 (19 total pages).
Irie, H., "Kumamoto Kenmin TV In-house network facility", Broadcast Engineering, Kenroku Kan Publishing Co., Ltd., Nishimura, Tamae, vol. 70, No. 11, 2017, pp. 145-147 (4 total pages).

(Continued)

*Primary Examiner* — Chris Parry
*Assistant Examiner* — Steven C Nguyen
(74) *Attorney, Agent, or Firm* — Oblon, McClelland, Maier & Neustadt, L.L.P.

(57) ABSTRACT

According to the present disclosure, provided is a network system including a plurality of devices and a network management apparatus connected to the plurality of devices by an IP transmission line, and the network management apparatus (100) includes a setting execution unit (116) configured to execute setting of a path to which the plurality of devices are connected, and setting of parameters for controlling the plurality of devices. With this configuration, it is possible to freely set a connection path and devices in a system in which a plurality of devices are connected.

20 Claims, 4 Drawing Sheets

(56) References Cited

U.S. PATENT DOCUMENTS

| | | | |
|---|---|---|---|
| 2010/0118164 A1* | 5/2010 | Fujita | H04N 5/262 348/240.99 |
| 2010/0318917 A1* | 12/2010 | Holladay | H04L 41/0893 715/810 |
| 2011/0205965 A1* | 8/2011 | Sprigg | G06F 9/4411 709/201 |
| 2012/0004739 A1* | 1/2012 | Sato | H04L 12/282 700/7 |
| 2012/0236160 A1* | 9/2012 | Rezek | H04N 5/222 348/E5.022 |
| 2014/0223315 A1* | 8/2014 | Hagiwara | H04L 41/22 715/736 |
| 2015/0109438 A1* | 4/2015 | Matsuda | H04N 5/23206 348/143 |
| 2015/0264295 A1 | 9/2015 | Hundemer | |
| 2017/0135129 A1* | 5/2017 | Zhou | H04L 12/189 |
| 2017/0171059 A1* | 6/2017 | Seligson | H04L 45/16 |
| 2018/0069752 A1* | 3/2018 | Igarashi | H04L 41/0853 |
| 2019/0222481 A1* | 7/2019 | Hira | H04L 41/0853 |

FOREIGN PATENT DOCUMENTS

| | | |
|---|---|---|
| JP | 2011022203 A | 2/2011 |
| JP | 2016-187176 A | 10/2016 |

OTHER PUBLICATIONS

Mizumachi, K., "Achievement of HDTV Program Operation Using the Internet Protocol Networks by Asahi Broadcasting Corporation", Journal of Information Processing Society of Japan, vol. 49, No. 1, 2008, pp. 79-88 (11 total pages).

Isobe, K., "Demonstration experiment of IP remote production", Broadcast Engineering, Kenroku Kan Publishing Co., Ltd., Nishimura, Tamae, vol. 70, No. 9, 2017, pp. 94-98 (6 total pages).

* cited by examiner

|  | PROGRAM A | PROGRAM B | ... |
|---|---|---|---|
| DEVICE X (CAMERA) | SETTING PARAMETER 1: VALUE (or MODE) a<br>SETTING PARAMETER 2: VALUE (or MODE) b | ... | ... |
| DEVICE Y (MONITOR) | SETTING PARAMETER 3: VALUE (or MODE) c<br>SETTING PARAMETER 4: VALUE (or MODE) d<br>SETTING PARAMETER 5: VALUE (or MODE) e | ... | ... |
| ... | ... | ... | ... |

Fig. 4

NETWORK SYSTEM, NETWORK MANAGEMENT APPARATUS, AND NETWORK MANAGEMENT METHOD EXECUTING SETTING OF A PATH AND PARAMETERS

TECHNICAL FIELD

The present disclosure relates to a network system, a network management apparatus, and a network management method.

BACKGROUND ART

In the related art, PTL 1 below describes a technology for assuming that operations are distributed to devices according to a load, availability, capacity, priority, and capacity of the devices.

CITATION LIST

Patent Literature

[PTL 1]
JP 4283851 B

SUMMARY

Technical Problem

For example, in a system in which a plurality of video devices are connected, there is a demand for free setting of a connection path even when the devices are present in remote places several tens of kilometers away. Further, when a plurality of different settings can be made for one device, there is a demand for performing optimal setting according to a situation.

The above PTL 1 describes distribution of operations to the devices, but does not assume that a connection path between the devices is freely set. Further, PTL 1 does not assume performing optimal setting according to a situation for any device of which different settings can be made.

Therefore, the connection path and the devices are desired to be able to be freely set in a system in which a plurality of devices are connected.

Solution to Problem

According to the present disclosure, there is provided a network system including: a plurality of devices and a network management apparatus connected to the plurality of devices by an IP transmission line, wherein the network management apparatus includes a setting execution unit configured to execute setting of a path to which at least some of the plurality of devices are connected, and setting of parameters regarding control of the at least some connected devices.

Further, according to the present disclosure, there is provided a network management apparatus connected to a plurality of devices by an IP transmission line, the network management apparatus including: a setting execution unit configured to execute setting a path to which at least some of the plurality of devices are connected and setting of parameters regarding control of the at least some connected devices.

Further, according to the present disclosure, there is provided a network management method in a network management apparatus connected to a plurality of devices by an IP transmission line, the method including: executing setting a path to which at least some of the plurality of devices are connected and setting of parameters regarding control of the at least some connected devices.

Advantageous Effects of Invention

As described above, according to the present disclosure, it is possible to freely set the connection path and the devices in the system in which the plurality of devices are connected.

The above effects are not necessarily limited and, together with or in place of the above effects, any effects shown in the present specification or other effects that can be ascertained from the present specification can be achieved.

BRIEF DESCRIPTION OF DRAWINGS

FIG. 4 is a schematic diagram illustrating a setting of a parameter of each device according to a TV program (program).

DESCRIPTION OF EMBODIMENTS

Figure 1:
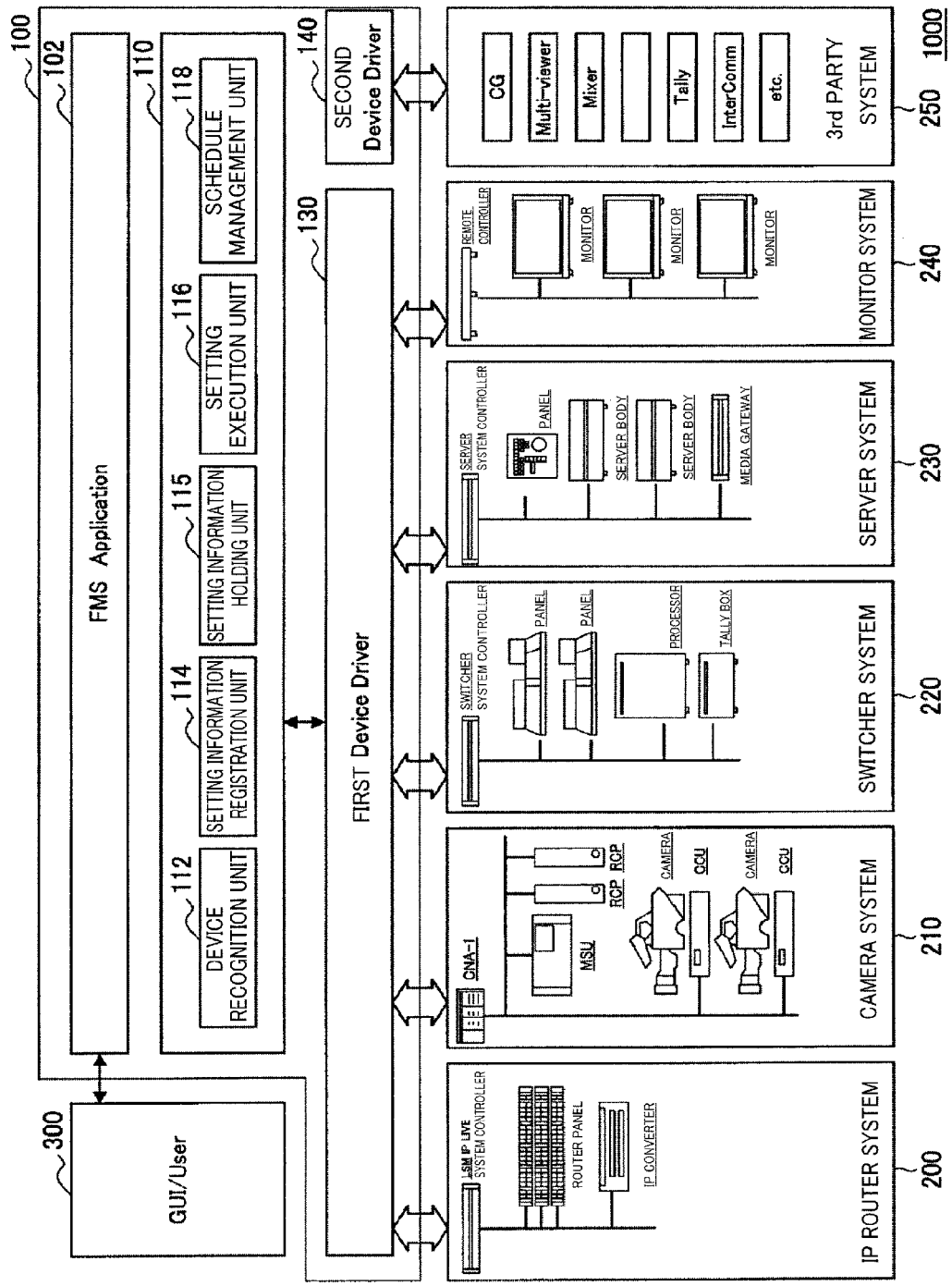
FIG. 1 is a schematic diagram illustrating a configuration of a system according to an embodiment of the present disclosure.

Hereinafter, preferred embodiments of the present disclosure will be described in detail with reference to the accompanying drawings. In the present specification and drawings, components having substantially the same functional configuration are denoted by the same reference signs and repeated description thereof will be omitted.

Description will be given in the following order.
1. Outline
2. Configuration example of system
3. Specific examples of operation in system
1. Outline The present disclosure relates to a system in which a plurality of devices and servers are connected. More specifically, the present disclosure relates to, for example, a system that is used when a broadcasting station produces a TV program.

At present, for example, when a TV program relaying sports in a stadium is produced, a relay vehicle is dispatched to a site so that a plurality of cameras disposed in the stadium can be connected to the relay vehicle. In this connection, the connection is generally made by a high-speed serial interface standard called serial digital interface (SDI), and a digital video signal and a digital audio signal are sent from the cameras to the relay vehicle.

However, since the relay vehicle and each camera are connected by the SDI at a relay site as described above, distance restrictions are caused. For example, it is difficult to construct the same system in a situation in which the relay vehicle and each camera are several tens of kilometers away from each other. Further, settings of the relay vehicle differ depending on a difference between environments for shooting TV programs (a difference between facilities such as stadiums or concert halls, a difference between camera installation places, a difference in brightness between shooting places, a difference between indoors and outdoors, or the like), and the reality is that a person performs setting of the relay vehicles according to the environment.

Further, for example, in a broadcasting station, there are a plurality of studios for shooting various TV programs such as news programs or variety programs. Not all of the plurality of studios are in operation at all times, and studios in which shooting is not performed are not in operation. In this case, devices relevant to a studio not in operation is not effectively utilized.

In view of the above, the present disclosure achieves reduction of production costs through minimization in numbers of devices or personnel dispatched to a site and assumes realization of remote integration for eliminating distance restrictions. In view of the above, the present disclosure assumes realization of shared integration (shared production) for achieving an increase in an operating rate of equipment through free combination of a plurality of studios and control rooms and dynamic assignment of resources according to a TV program scale. When remote integration and shared integration are combined, it is possible to perform effective utilization of devices or people, and to greatly reduce production costs of TV programs or the like.

In the present disclosure, a mechanism of a facility management software (FMS) system is introduced in order to realize the remote integration and the shared integration described above. In a system using the FMS, a photographing device such as a camera, a device in a studio, or the like and the FMS server are connected by IP, and distance restrictions are solved. Further, since setting of various devices is performed on the basis of setting information of the FMS server, the settings of the devices can be rapidly switched, and effective utilization of a studio or the like not in operation can be realized. Hereinafter, a system using the FMS according to the present disclosure will be described in detail.

2. Configuration Example of System

FIG. 1 is a schematic diagram illustrating a configuration of a system 1000 according to an embodiment of the present disclosure. As illustrated in FIG. 1, this system 1000 includes an FMS server (network management apparatus) 100, an IP router system 200, a camera system 210, a switcher system 220, a server system 230, a monitor system 240, and a 3rd party system 250. The IP router system 200, the camera system 210, the switcher system 220, the server system 230, the monitor system 240, and the 3rd party system 250 are connected to the FMS server 100 by IP. Further, a graphical user interface (GUI) 280 is connected to the FMS server 100. The GUI 280 may be a client terminal such as a laptop PC.

The camera system 210 is, for example, a system having a device provided by the same supplier as that providing the FMS server 100. On the other hand, the 3rd party system 250 may be a system having a device provided by a supplier different from that providing the FMS server 100. The switcher system 220 is a system having a device having functions such as video switching and CG synthesis. Further, the server system 230 is a system having a device that performs, for example, slow or replay reproduction, and the monitor system 240 is a system having a device that allows a video engineer or the like to confirm a video.

The FMS server 100 is configured by software (program) of an FMS application 102 being installed, and includes a core engine 110 for performing functions thereof. The FMS server 100 includes a device recognition unit 112, a setting information registration unit 114, a setting information holding unit 115, a setting execution unit 116, and a schedule management unit 118 as functional blocks thereof. Further, the FMS server 100 includes a first device driver 130 that is an interface for connection with the IP router system 200, the camera system 210, the switcher system 220, the server system 230, and the monitor system 240. Further, the FMS server 100 includes a second device driver 140 that is an interface for connection to the 3rd party system 250. A plurality of device drivers may be provided for each manufacturer or depending on an OS. Each of the functional blocks including the device recognition unit 112, the setting information registration unit 114, the setting information holding unit 115, the setting execution unit 116, and the schedule management unit 118 is configured of a central processing unit such as a CPU included in the FMS server 100 and a program (software) for causing the central processing unit to function, or is configured of a circuit (hardware).

The device recognition unit 112 exchanges information with various devices connected to the FMS server 100 to recognize a connection of each of the various devices and to recognize a setting state of the various devices. In FIG. 1, the IP router system 200, the camera system 210, the switcher system 220, the server system 230, the monitor system 240, and the 3rd party system 250 are connected to the FMS server 100. Therefore, the connection of these devices and the setting state of the devices are recognized by the device recognition unit 112.

A user can set the devices connected to the FMS server 100 to a desired setting by operating the GUI 280, for example. The setting information registration unit 114 registers setting information input by the user operating the GUI 280 in the FMS server 100. Further, the setting information registration unit 114 can also register setting information set using another method in the FMS server 100. Further, the setting information holding unit 115 holds the setting information registered by the setting information registration unit 114.

The setting execution unit 116 sends the setting information registered by the setting information registration unit 114 to each of the devices such as the IP router system 200, the camera system 210, the switcher system 220, the server system 230, the monitor system 240, and the 3rd party system 250 to perform setting of each device. The setting of the respective devices such as the camera system 210, the switcher system 220, the server system 230, and the monitor system 240 is performed via the first device driver 130. Further, the setting of the device of the 3rd party system 250 is performed via the second device driver 140.

The schedule management unit 118 manages setting of each device on the basis of time information. For example, when the camera of the camera system 210 is set to be turned on at a predetermined time, the schedule management unit 118 manages the predetermined time so that the setting execution unit 116 turns the camera on at the predetermined time.

According to the FMS server 100 configured as described above, the setting information of the various devices connected to the FMS server 100 is recognized on the FMS server 100 side, and the setting information of the user is reflected in each device. Since the FMS server 100 is connected to each of the devices such as the IP router system 200, the camera system 210, the switcher system 220, the server system 230, the monitor system 240, and the 3rd party system 250 by an IP network, it is possible to freely change settings of remote devices. In this case, it is possible to freely set a path to each device such as the camera of the camera system 210 by changing the setting of the IP router system 200. Further, when each device such as the IP router system 200, the camera system 210, the switcher system 220, the server system 230, the monitor system 240, and the 3rd party system 250 is connected to a plurality of studios, the settings of each device are optimized so that each device can be shared by a plurality of studios. Thus, it is possible to realize the remote integration and the shared integration described above.

3. Specific Examples of Operation in System

Figure 2:
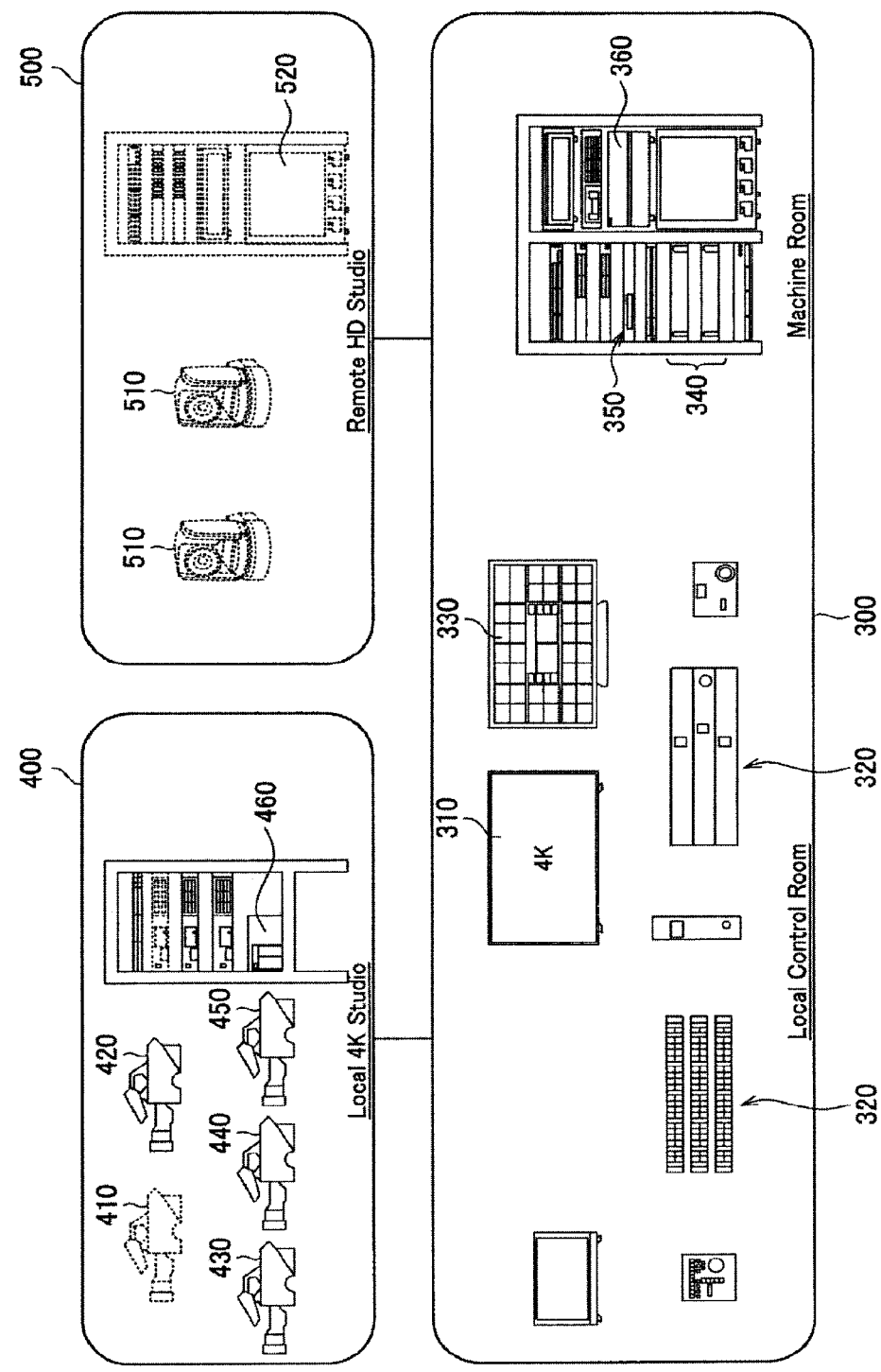
FIG. 2 is a schematic diagram illustrating a specific example of an operation that is realized by the system of the present disclosure.
Figure 3:
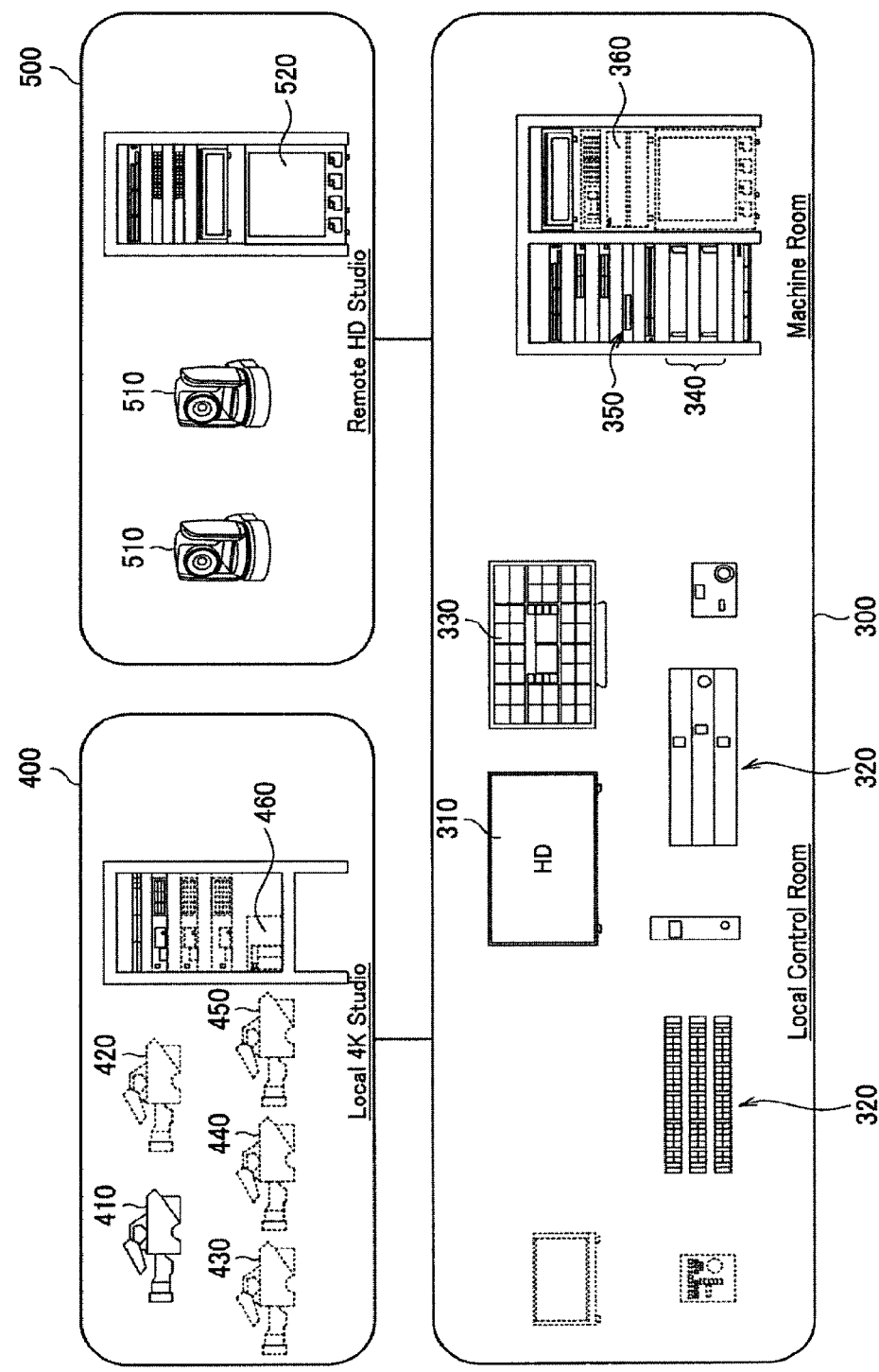
FIG. 3 is a schematic diagram illustrating a specific example of an operation that is realized by the system of the present disclosure.

Next, specific examples of an operation that is realized by the system 1000 of the present disclosure will be described. FIGS. 2 and 3 are schematic diagrams illustrating specific examples of the operation that is realized by the system 1000 of the present disclosure.

In the examples illustrated in FIGS. 2 and 3, a control base 300, a local studio 400 mainly configured of 4K compatible devices, and a remote studio 500 mainly configured of HD compatible devices are configured as the bases for using each device. The local studio 400 is provided at a position relatively close to the control base 300, and the remote studio 500 is provided at a remote place about several tens of kilometers away from the control base 300, for example. Further, each device may be provided in a relay vehicle for shooting a live video or the like.

The control base 300 includes a monitor 310, a panel 320, a multi-viewer 330, a system controller 340, a network switch 350, and a recording server 360. The monitor 310, the panel 320, and the multi-viewer 330 are provided in the control room of the control base 300, and the system controller 340, the network switch 350, and the recording server 360 are provided in a machine room of the control base 300.

The local studio 400 includes a plurality of cameras 410, 420, 430, 440, and 450 and a camera control unit 460 that controls the cameras 410, 420, 430, 440, and 450.

The remote studio 500 includes a surveillance camera 510, a video switcher 520, and an audio system (not illustrated).

According to the system 1000 of the present disclosure, setting can be performed on various devices included in each of the control base 300, the local studio 400, and the remote studio 500. This setting can be roughly divided into setting of a transmission path based on the setting of the IP router system 200 (corresponding to the network switch 350 in FIGS. 2 and 3) described above and setting of each device based on settings of the parameters regarding the control of each device.

The setting of the transmission path differs between FIGS. 2 and 3. By the transmission path being set, a desired device among the various devices included in each of the control base 300, the local studio 400, and the remote studio 500 is connected to the transmission path. In FIGS. 2 and 3, the devices connected to the transmission path are indicated by solid lines, and the devices not connected to the transmission path are indicated by broken lines.

In a state illustrated in FIG. 2, the transmission path is set, and the monitor 310, the panel 320, the multi-viewer 330, the system controller 340, the network switch 350, and the recording server 360 belonging to the control base 300 are connected to the transmission path. Further, the cameras 420, 430, 440, and 450 and the camera control unit 460 among the cameras 410, 420, 430, 440, and 450 and the camera control unit 460 belonging to the local studio 400 are connected to the transmission path. Further, in the state illustrated in FIG. 2, all the devices belonging to the remote studio 500 are not connected to the transmission path.

Further, in a state illustrated in FIG. 3, the recording server 360 among the devices belonging to the control base 300 is not connected to the transmission path. Further, in the state illustrated in FIG. 3, only the camera 410 among the cameras 410, 420, 430, 440, and 450 and the camera control unit 460 belonging to the local studio 400 is connected to the transmission path. Further, in the state illustrated in FIG. 3, the surveillance camera 510 and the video switcher 520 among the devices belonging to the remote studio 500 are connected to the transmission path.

As described above, it is possible to freely set a connection between the control base 300, the local studio 400, and the remote studio 500 by performing setting of the network switch 350 from the FMS server 100. This makes it possible to realize the remote integration described above. A disposition place of the FMS server 100 may be the machine room of the control base 300, or the remote studio 500.

Further, according to the system 1000 of the present disclosure, it is possible to perform setting of parameters for controlling various devices included in each of the control base 300, the local studio 400, and the remote studio 500 from the FMS server 100.

Hereinafter, settings that can be performed by each device will be described. In the device belonging to the control base 300, the monitor 310 can change settings regarding input selection, 4K/HD change, and recall of preset image quality settings. The panel 320 can change settings regarding switching between functions assigned to buttons and changing a control target. The multi-viewer 330 can change settings regarding changing a screen layout. The system controller 340 can change settings regarding changing video and audio paths, changing a crosspoint matrix, changing system synchronization settings, and partially changing settings of a control target device. The network switch 350 can change settings regarding changing a connection relationship between devices and changing settings for guaranteeing a transmission band. The recording server 360 can change settings regarding changing a recording codec and changing an operating frequency.

Further, in the devices belonging to the local studio 400, the plurality of cameras 410, 420, 430, 440, and 450 can change settings regarding changing 4K/HD, changing image quality settings (gain or color tone), and changing an operating frequency. Similarly, the camera control unit 460 can also change settings regarding changing 4K/HD, changing image quality settings (gain or color tone), and changing an operating frequency.

Further, in the devices belonging to the remote studio 500, the video switcher 520 can change settings regarding changing an operating frequency, exchanging moving image data that is used at the time of recording, and registering macro functions. Further, the audio system belonging to the remote studio 500 can change settings regarding volume adjustment and channel setting.

By sending information on parameters regarding the setting described above from the FMS server 100 to each device, it is possible to freely perform the setting of each device. Therefore, it is possible to realize the shared integration described above.

For example, in the state illustrated in FIG. 2, the monitor 310 in the control base 300 has been set to support 4K compatible settings. On the other hand, in the state illustrated in FIG. 3, the monitor 310 in the control base 300 has been set to support HD compatible settings. Such setting can be realized by parameters for these settings being sent from the FMS server 100.

When a TV program or the like is produced by a 4K device, the user can operate the local studio 400 for 4K by operating the GUI 280. Further, when a TV program or the like is produced by an HD device, the user can operate the remote studio 500 for HD by operating the GUI 280. When the local studio 400 for 4K is operated, videos captured by the cameras 410, 420, 430, 440, and 450 for 4K are displayed on the monitor 310 of the control base 300 set to 4K. When the remote studio 500 for HD is operated, the HD surveillance camera 510 and the HD video switcher 520 are controlled such that an HD video is sent to the control base 300 and displayed on the monitor 310. As described above, in each of the control base 300, the local studio 400, and the remote studio 500, it is possible to freely perform setting of each device in a range in which the settings of each device can be changed.

A plurality of control bases 300 may be provided, but the number of control bases 300 can be made smaller than the number of studios such as the local studio 400 and the remote studio 500. Therefore, it is possible to control a plurality of studios with a number of control bases 300 smaller than the number of studios.

FIG. 4 is a schematic diagram illustrating setting of parameters of each device according to a TV program (program). A setting value is determined for attributes (combination of one or a plurality of elements such as "studio", "content type (4K/HD, HDR/SDR, sports/variety, and the like)", and "relay time period") of the program in advance. The parameters may be set for each specific program (TV program).

In FIG. 4, for device X, values a and b of two parameters (setting parameter 1 and setting parameter 2) are determined in the case of the program A. Further, for device Y, values c, d, and e of three parameters (setting parameter 3, setting parameter 4, and setting parameter 5) are determined in the case of program A. As illustrated in FIG. 4, modes may be determined instead of the parameter values.

For example, when an example of device X is the panel 320 of the control base 300, the panel 320 can change the settings regarding switching between the functions assigned to the buttons and changing the control target as described above. A parameter regarding switching between the functions assigned to the buttons corresponds to setting parameter 1 in FIG. 4, and a parameter regarding changing the control target corresponds to setting parameter 2 in FIG. 4. Therefore, "switching between the functions assigned to the buttons" is determined according to a value a of setting parameter 1, and "changing the control target" is determined according to a value b of setting parameter 2.

When the setting parameters of each device are determined according to the attributes of the program in advance as described above, the settings of the devices can be optimally performed according to the program.

Information on the setting parameter illustrated in FIG. 4 is held in the setting information holding unit 115 of the FMS server 100. Therefore, when the user designates program A from the GUI 300, the setting parameters of each device are read from the setting information holding unit 115, and setting of each device is performed by the setting execution unit 116.

The user can designate a time and a TV program (program) in advance and make a reservation for devices that are used for production of the TV program. At the time designated by the user, the FMS server 100 connects to the device reserved in advance and changes the settings of each of the devices to the settings of the TV program designated by the user. In this case, the information on the setting parameters illustrated in FIG. 4 is held in the setting information holding unit 115 of the FMS server 100. Therefore, the setting parameters of each device are read from the setting information holding unit 115, and setting of each device is performed by the setting execution unit 116.

When automatic scheduling is performed, the user only designates the time and the TV program. The setting execution unit 116 specifies necessary devices and assignable devices from the TV program designated by the user and automatically reserves the devices. The setting execution unit 116 changes the settings of the specified device to those according to the program at the time designated by the user.

The FMS server 100 may receive a data set of setting values from each device so that the data set is written back. This corresponds to a case in which, when the device itself has a mechanism for backing up a plurality of setting values in their entirety (corresponding to the setting information holding unit 115 in FIG. 1), data is acquired using binary data of the device itself or a text structure such as XML or JSON and written back so that settings are recalled.

Further, the device itself may hold the settings as preset settings, and the FMS server 100 may call the preset settings. This corresponds to a case in which the settings are stored as preset settings inside the device, although the settings cannot be taken out as data. For example, the FMS can designate something like a preset number in order to recall the settings.

Although the preferred embodiments of the present disclosure have been described in detail with reference to the accompanying drawings, the technical scope of the present disclosure is not limited to such examples. It is obvious that anyone with ordinary knowledge in the technical field of the present disclosure may conceive various modification examples or change examples within the scope of the technical ideas set forth in the claims and, of course, it is understood that these belong to the technical scope of the present disclosure.

Further, effects described in the present specification are merely descriptive or illustrative and are not limited. That is, the technology according to the present disclosure may exhibit other effects apparent to those skilled in the art from the description in the present specification, in addition to or in place of the above effects.

The following configurations also belong to a technical scope of the present disclosure.

(1)

A network system including a plurality of devices and a network management apparatus connected to the plurality of devices by an IP transmission line, wherein the network management apparatus includes a setting execution unit configured to execute setting of a path to which at least some of the plurality of devices are connected, and setting of parameters regarding control of the at least some connected devices.

(2)

The network system according to (1), wherein the network management apparatus includes a setting information registration unit configured to register setting information on settings of the plurality of devices, and the setting execution unit executes the setting on the basis of the setting information.

(3)

The network system according to (2), wherein the setting information registration unit registers the setting information on the basis of information input by a user.

(4)

The network system according to (2), wherein the network management apparatus includes
a setting information holding unit configured to hold the setting information.

(5)

The network system according to any one of (1) to (4), wherein the network management apparatus includes
a schedule management unit configured to manage a schedule for execution of the setting in the setting execution unit.

(6)

The network system according to any one of (1) to (5), wherein the network management apparatus includes
a device recognition unit configured to recognize that the plurality of devices are connected, and the setting execution unit executes the setting for the plurality of devices of which the connection is recognized.

(7)

The network system according to any one of (1) to (6), wherein the plurality of devices include a network switch configured to change the route, and the setting execution unit changes the setting of the network switch according to the setting of the parameters.

(8)

The network system according to any one of (1) to (7), wherein the plurality of devices include video devices, and the setting execution unit performs changing a 4K and HD setting, changing an image quality setting, or changing an operating frequency through setting of the parameters.

(9)

The network system according to any one of (1) to (8), wherein the plurality of devices are included in a plurality of studios installed at different positions.

(10)

The network system according to any one of (1) to (8), wherein the plurality of devices are included in a relay vehicle for capturing a video.

(11)

A network management apparatus connected to a plurality of devices by an IP transmission line, the network management apparatus including a setting execution unit configured to execute setting a path to which at least some of the plurality of devices are connected and setting of parameters regarding control of the at least some connected devices.

(12)

A network management method in a network management apparatus connected to a plurality of devices by an IP transmission line, the method including executing setting a path to which at least some of the plurality of devices are connected and setting of parameters regarding control of the at least some connected devices.

REFERENCE SIGNS LIST

100 FMS server
112 Device recognition unit
114 Setting information registration unit
115 Setting information holding unit
116 Setting execution unit
118 Schedule management unit

The invention claimed is:

1. A network system, comprising:
a plurality of devices, wherein the plurality of devices includes video devices; and
a network management apparatus connected to the plurality of devices by an IP transmission line, wherein the network management apparatus includes processing circuitry configured to:
execute a first setting, based on user input via a user interface, of a transmission path to which at least some of the plurality of devices are connected, wherein remaining ones of the plurality of devices are not connected to any path to the network management apparatus and thereby not connected to the transmission path, the first setting determining which of the plurality of devices are connected to the transmission path by changing settings of a network switch,
execute a second setting of parameters regarding control of the at least some connected devices, without executing setting of parameters for the remaining ones of the plurality of devices that are not connected to the transmission path, and
change a 4K and HD setting or change an image quality setting through setting of the parameters.

2. The network system according to claim 1, wherein the processing circuitry of the network management apparatus is further configured to:
register setting information on settings of the plurality of devices, and
execute the first setting based on the setting information.

3. The network system according to claim 2, wherein the processing circuitry is further configured to register the setting information based on information input by the user.

4. The network system according to claim 2, wherein the network management apparatus further includes a memory configured to hold the setting information.

5. The network system according to claim 1, wherein the processing circuitry is further configured to manage a schedule for execution of the second setting.

6. The network system according to claim 1, wherein the processing circuitry is further configured to recognize that the at least some of the plurality of devices are connected, and execute the second setting for the at least some of the plurality of devices of which the connection is recognized.

7. The network system according to claim 1, wherein the plurality of devices include the network switch configured to change a route, and
the processing circuitry is further configured to change the settings of the network switch according to the user input.

8. The network system according to claim 1, wherein the processing circuitry is further configured to change an operating frequency through setting of the parameters.

9. The network system according to claim 1, wherein the plurality of devices are included in a plurality of studios installed at different positions.

10. The network system according to claim 1, wherein the plurality of devices are included in a relay vehicle for capturing a video.

11. A network management apparatus connected to a plurality of devices by an IP transmission line, the network management apparatus comprising:
processing circuitry configured to:
execute a first setting, based on user input via a user interface, of a transmission path to which at least some of the plurality of devices are connected, wherein remaining ones of the plurality of devices are not connected to any path to the network management apparatus and thereby not connected to the transmission path, the first setting determining which of the plurality of devices are connected to the transmission path by changing settings of a network switch, execute a second setting of parameters regarding control of the at least some connected devices, without executing setting of parameters for the remaining ones of the plurality of devices that are not connected to the transmission path, and change a 4K and HD setting or change an image quality setting through setting of the parameters, wherein the plurality of devices includes video devices.

12. A network management method in a network management apparatus connected to a plurality of devices by an IP transmission line, the method comprising:

executing a first setting, based on user input via a user interface, of a transmission path to which at least some of the plurality of devices are connected, wherein remaining ones of the plurality of devices are not connected to any path to the network management apparatus and thereby not connected to the transmission path, the first setting determining which of the plurality of devices are connected to the transmission path by changing settings of a network switch;

executing a second setting of parameters regarding control of the at least some connected devices, without executing setting of parameters for the remaining ones of the plurality of devices that are not connected to the transmission path, and changing a 4K and HD setting or changing an image quality setting through setting of the parameters, wherein the plurality of devices includes video devices.

13. The network management method according to claim 12, further comprising:

registering setting information on settings of the plurality of devices, and executing the first setting based on the setting information.

14. The network management method according to claim 13, further comprising:

registering the setting information based on information input by the user.

15. The network management method according to claim 12, further comprising:

managing a schedule for execution of the second setting.

16. The network management method according to claim 12, further comprising:

recognizing that the at least some of the plurality of devices are connected; and executing the second setting for the at least some of the plurality of devices of which the connection is recognized.

17. The network management method according to claim 12, wherein the plurality of devices include the network switch configured to change a route, and the method further comprises:

changing the settings of the network switch according to the user input.

18. The network management method according to claim 12, wherein the method further comprises changing an operating frequency through setting of the parameters.

19. The network management method according to claim 12, wherein the plurality of devices are included in a plurality of studios installed at different positions.

20. The network management method according to claim 12, wherein the plurality of devices are included in a relay vehicle for capturing a video.

* * * * *